Jan. 2, 1934. W. E. CHAMBERS 1,942,238
APPARATUS FOR GRADING MUSHROOMS
Filed March 12, 1932   2 Sheets-Sheet 1
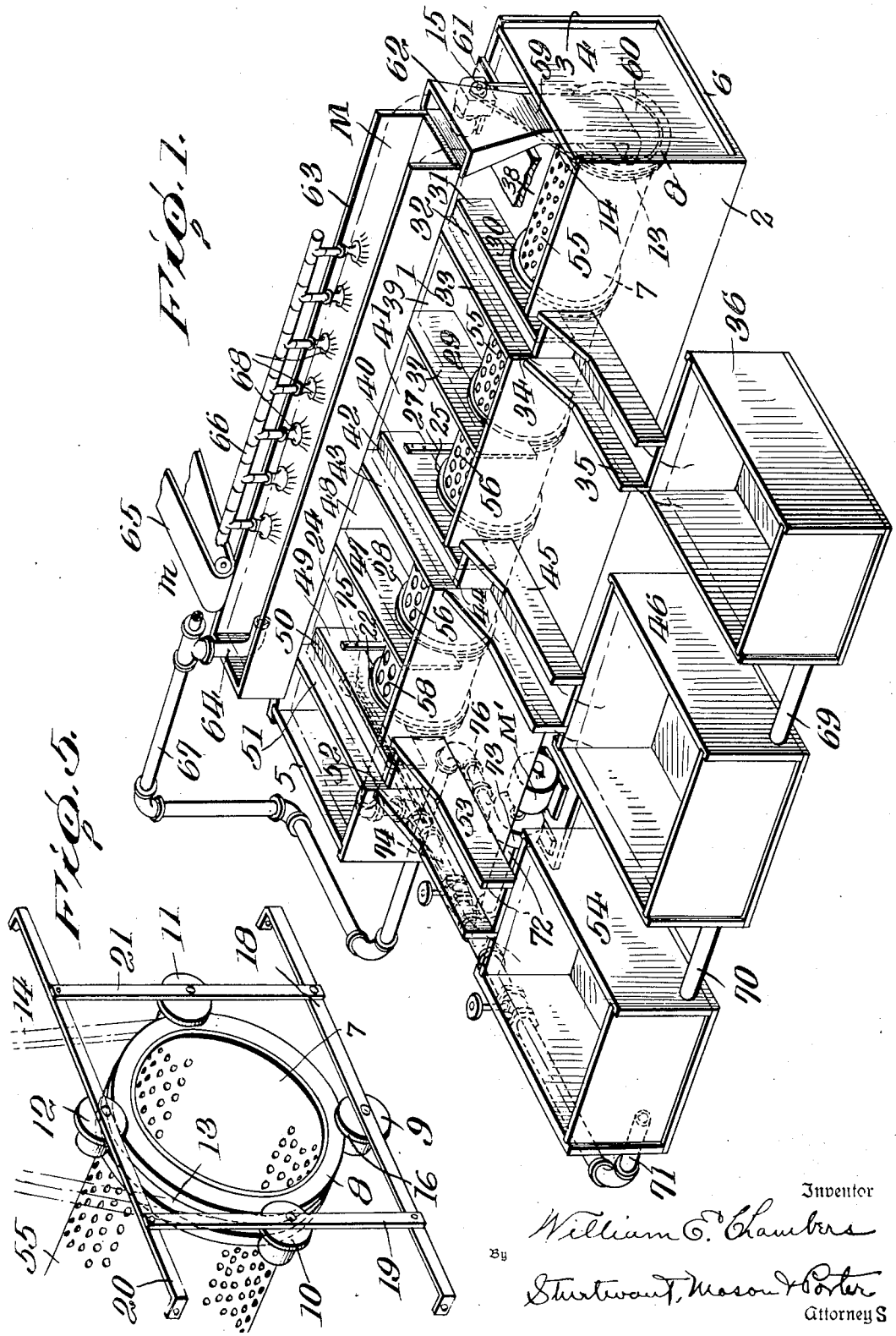
Inventor
William E. Chambers
By
Sturtevant, Mason & Porter
Attorneys Jan. 2, 1934.　　　　W. E. CHAMBERS　　　　1,942,238
APPARATUS FOR GRADING MUSHROOMS
Filed March 12, 1932　　　2 Sheets-Sheet 2
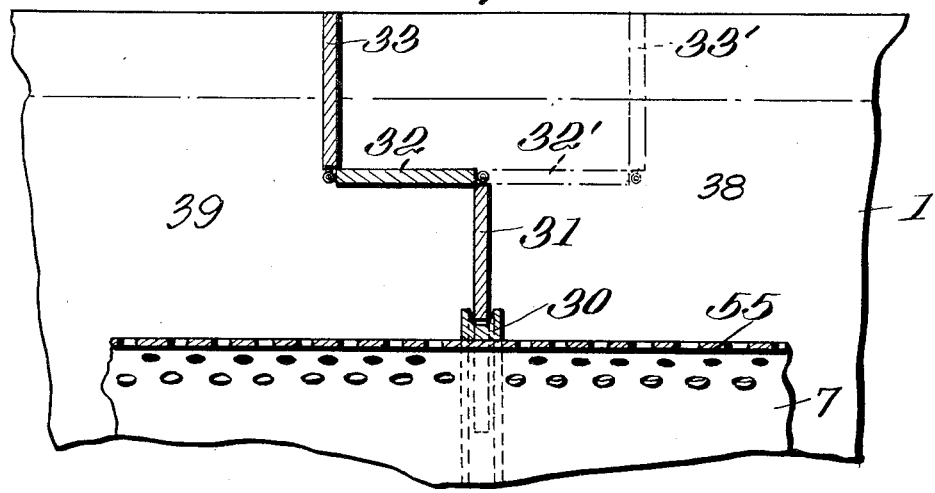
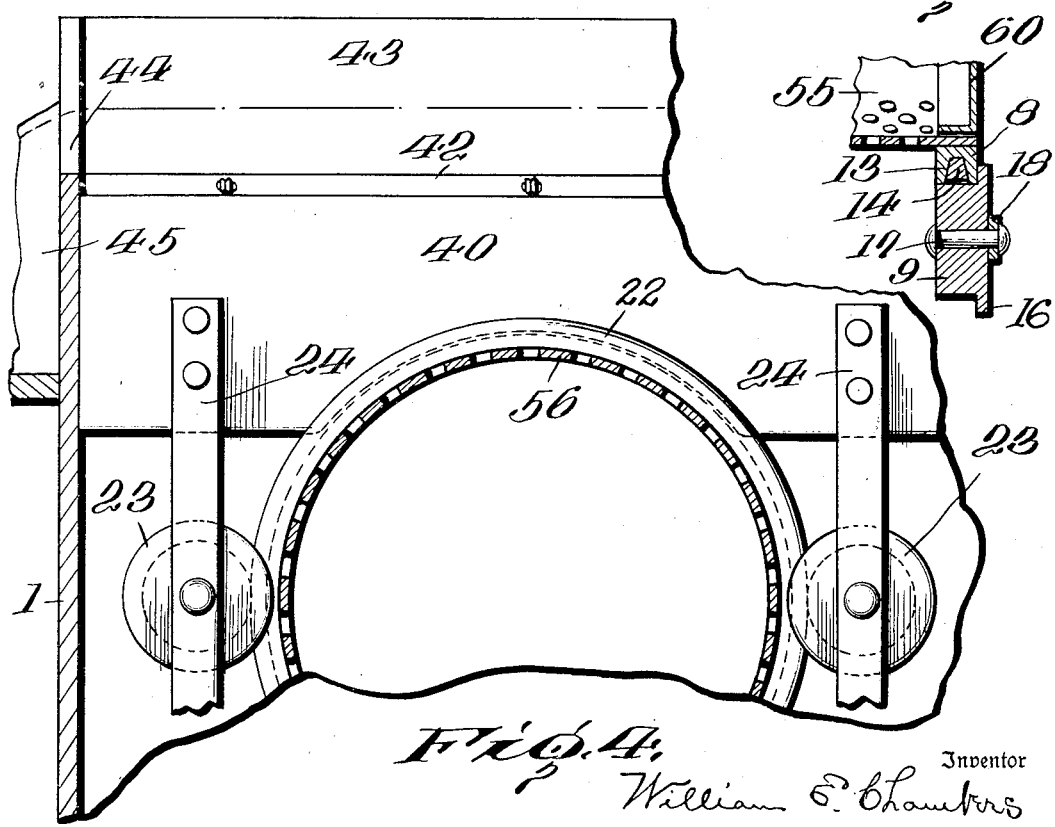
Inventor
William E. Chambers
By Sturtevant, Mason & Porter
Attorneys Patented Jan. 2, 1934

1,942,238

UNITED STATES PATENT OFFICE 1,942,238

APPARATUS FOR GRADING MUSHROOMS

William E. Chambers, West Chester, Pa.

Application March 12, 1932. Serial No. 598,515

4 Claims. (Cl. 209—288)

The invention relates to new and useful improvements in a grading apparatus wherein articles are classified according to size.

An object of the invention is to provide a grading apparatus whereby mushrooms may be graded according to size and conveyed during grading by flowing water.

Another object of the invention is to provide a grading apparatus of the above type wherein the mushrooms are conveyed into the grading apparatus by a flowing stream of water which carries the mushrooms beneath the surface of the water in the grading tank and into the grading cylinder.

A still further object of the invention is to provide an apparatus of the above type wherein the buoyancy of the mushrooms is utilized for passing the mushrooms through the grading screen.

A still further object of the invention is to provide an apparatus of the above type wherein water is used to convey the graded mushrooms to collecting tanks therefor so that the mushrooms are handled while being graded entirely by the flowing water stream.

These and other objects will in part be obvious and will in part be hereinafter more fully disclosed.

In the drawings which show by way of illustration one embodiment of the invention—

Figure 1 is a perspective view showing an apparatus embodying the invention;

Fig. 2 is a view in transverse section through the grading tank and showing a portion of the grading cylinder and one of the partitions for dividing the tank into compartments, and also the means for controlling the discharge from two adjacent compartments successively into the collecting tank.

Fig. 3 is an enlarged view showing the supporting and driving means for the grading cylinder at the receiving end thereof, Fig. 4 is a transverse sectional view through a portion of the tank, and Fig. 5 is a perspective view of the receiving end of the grading cylinder and showing the supporting frame and rollers therefor, the means for closing the end of the grading cylinder being omitted.

The invention is directed to an apparatus for grading mushrooms as to size. The apparatus includes a tank which is watertight and in which is located a grading cylinder. The tank is divided in the upper portion thereof by transverse partitions into compartments, and the openings in the cylinder in the successive compartments are of gradually increasing size toward the delivery end of the cylinder. The cylinder is supported on rollers and is rotated by a suitable motor. The cylinder is inclined from its receiving end upwardly toward its delivery end. At the receiving end of the cylinder there is a head which closes the cylinder and which is stationary. This head is carried by a pipe or chute which opens through the head into the grading cylinder. The pipe extends above the tank and is provided with a hopper adapted to receive flowing water containing the mushrooms to be graded. The pipe is kept filled with water, and in this manner the tank is supplied with water to a level above the upper side of the grading cylinder. Thus it is that the mushrooms are forcibly carried with the flowing stream of water beneath the surface of the water in the tank and into the grading cylinder. Extending along and above the tank is a trough into which the stream of water is directed. Over the trough there are a series of sprays. The mushrooms are delivered into this trough and are carried along the trough by the flowing water, and the sprays are for the purpose of washing the mushrooms as they are floated along the trough.

Extending from one side of the tank are a series of troughs located at the partitions. These troughs are located above the grading screen and determine the level of the water in the tank. The mushrooms passing out through the openings in the grading cylinder collect on the surface of the water in the compartments and are conveyed by the flowing water out through the troughs into collecting tanks.

Referring more in detail to the drawings, the apparatus for grading mushrooms includes a tank 1 which as shown is formed of side walls 2, 3, end walls 4, 5 and a bottom wall 6. This tank is watertight. Located in the tank is a grading cylinder 7 which as shown in the drawings is circular in cross section. It will be understood, however, that this grading cylinder may be made of short flat sides, if desired. Attached to the receiving end of the cylinder is an annular supporting and bearing member 8. This bearing member 8 rests on rollers 9, 10 and 11, and is also guided by a roller 12. As shown in Fig. 3 of the drawings, the annular member 8 is provided with a V-shaped groove 13 in which a belt 14 runs and this belt runs over a pulley 15 in a reduction gear mechanism driven by a motor M. The roller 9 is provided with a flange 16. This roller is mounted on a bearing support 17 attached to an angle bar 18 which in turn is secured to the walls of the tank. There is a vertically disposed angle bar 19 secured to this bar 18 and carrying the roller 10. Attached to the upper end of the angle bar 19 is an angle bar 20 which carries the roller 12. This angle bar 20 is also attached to the side wall of the tank. There is an angle bar 21 attached to the angle bar 18 and carrying the roller 11. At the upper end of the angle bar 21 is an angle bar attached to the tank.

At the rear end of the grading cylinder there is a similar annular supporting member 22 which does not have any driving groove for a belt. There are also rollers 23, 23 for supporting the annular member 22 and the angle bar frame 24 carrying these rollers. Midway of the grading screen there is an annular supporting member 25. There is also an angle bar frame 27 carrying rollers which engage this supporting member 25, similar to the rollers 23 engaging the annular member 22. There are also annular members 28, 29 and 30. The annular members 22, 25, 28, 29 and 30 are provided with two flanges and the supporting rolls associated therewith are unflanged and engage the annular member between the flanges thereof.

Extending transversely of the tank is a partition 31. This partition extends from a point a short distance below the upper part of the grading cylinder to a point a short distance below the upper edge of the tank. Hinged to the upper edge of the partition 31 is a floor board 32 and hinged to this floor board 32 is a vertical board 33 which extends to the upper edge of the tank. The partition wall 3 is cut away at 34 to the upper edge of the partition 31. Attached to the side wall 3 of the tank is a trough 35 consisting of side members and a bottom member which is joined to the outer face of the tank at the lower side of the cut away portion 34. This trough extends over the top of a tank 36 which is a collecting tank. Water is supplied to the tank 4 and will fill the tank to a level above the outlet to the trough 35 and will flow out through the trough 35 into the collecting tank 36. The floor member 32 is hinged to the partition 31 so that it may be swung to the other side thereof as shown at 32' in broken lines in Fig. 2. The vertical board 33 is again positioned in a vertical position as indicated at 33'. Suitable means is provided at the inner wall of the trough for holding the floor board and vertical board in these two different set positions, the purpose of which will be explained later. The partition 31 extends between the flanges on the annular member 30 as shown in detail in Fig. 4 of the drawings.

There is a partition 37 associated with the annular member 29 which extends all the way to the top of the tank. The partition 31 forms a compartment 38, and the partition 37 forms a compartment 39. There is a partition 40 forming a compartment 41, and associated with the partition 40 is a floor board 42 and a vertical board 43 similar in construction to the floor board 32 and vertical board 33. At the side wall of the tank there is a recess 44 leading to a trough 45, and this trough discharges into a tank 46.

There is a partition 47 forming a compartment 48. This partition extends all the way to the top of the tank. There is a partition 49 at the end of the grading cylinder. Associated with this partition is a floor board 50 and a vertical board 51 which are hinged so as to swing to different set positions as described in connection with the floor board 32 and vertical board 33. In the side wall of the tank is a recess 52 and associated with this recess is a trough 53 leading to a tank 54.

The grading cylinder is provided with openings 55. The openings 55 in the section of the grading cylinder located in the compartment 38 are of uniform size throughout the compartment, but are smaller than the openings 55' in the section of the grading cylinder associated with the compartment 39. Likewise, the openings 56 are slightly larger than the openings 55'. The openings 57 associated with the compartment 48 are still larger, and the openings 58 in the grading cylinder section associated with the compartment 49 are still larger.

At the receiving end of the grading cylinder there is a chute or pipe 59 which is connected to a head 60 shaped so as to close the end of the grading cylinder so as to prevent the mushrooms delivered into the grading cylinder from passing out of the receiving end of the cylinder. This head is supported free of the cylinder by the chute or pipe 59, and the chute or pipe 59 is attached to a cross plate 61 at the top of the tank. The chute or pipe, as shown, is rectangular in cross section. It may be circular in cross section, or of any desired shape, but it is essential that it shall be closed in cross section. The upper end of the chute or pipe tapers outwardly so as to provide a receiving hopper 62.

Extending lengthwise of the tank 1 is a receiving trough 63 consisting of side members and a bottom member, and an end member at the receiving end. There is no end member at the discharge end of the trough, nor at the upper side of the trough. Water is carried into this trough from a pipe 64. The mushrooms to be graded are discharged into the trough at the closed end thereof by a conveying belt 65. The mushrooms are indicated at *m*. Extending over the trough 63 is a pipe 66 which is connected to a supply pipe 67. This supply pipe 67 carries the pipe 64. Attached to the pipe 66 is a series of sprays 68. The trough is filled to a proper level with water from the supply pipe and the sprays so as to float the mushrooms along the trough by the water which is discharged from the open end of the trough. As the floating mushrooms pass beneath the sprays they are thoroughly washed. The volume of water passing along the trough is sufficient to substantially fill the trough 59. This water passing through the trough and into the grading cylinder passes out through the perforations and the discharge end thereof, filling the tank 1 to a level so that it flows on to the several floor boards and out through the chutes 35, 45 and 53 into the respective collecting tanks. The grading cylinder is inclined upwardly slightly toward the delivery end thereof. The buoyancy of the mushrooms tend to carry them to the surface of the water in which they are immersed. The flowing stream through the pipe or chute 59 will carry the mushrooms down beneath the surface of the water in the tank and discharge the same into the grading cylinder. By their buoyancy they will be carried upward against the inner face of the top of the grading cylinder, and the mushrooms which are small enough to pass through the openings 55 will pass out into the compartment 38 and come to the surface of the water and will be carried along by the flowing water on to the floor board 32 and out through the chute 35 into the collecting tank 36. Mushrooms which are not small enough to pass through the openings 55 will be carried along by the flowing water into the section of the grading screen at the compartment 39, and here again the mushrooms which are of a size to pass through the openings 55' will find their way through the grading cylinder through the buoyancy of the mushrooms tending to bring it to the surface of the water in the tank. The mushrooms will collect in this compartment 39 at the surface of the water, and when the floor board 32 is shifted to the position shown in broken lines in Fig. 2, then the mushrooms in the compartment 39 will be discharged into the collecting tank 36, while the mushrooms gathering in the compartment 38 will be held therein until the floor board is again shifted. In other words, the tank 36 serves as a collecting tank for both the compartment 38 and the compartment 39. The mushrooms collecting from the compartment 38 will be dipped from this tank 36, and then the collecting tank may be used to receive the mushrooms from the compartment 39. The same procedure follows as the mushrooms pass along the grading cylinder and the mushrooms will be collected according to size and discharged into the collecting tanks 46 and 54. The mushrooms which do not pass through any of the openings will pass out of the delivery end of the grading cylinder and collect in the compartment at the end of the tank.

There is a pipe 69 connecting the tank 36 with the tank 46, and a pipe 70 connecting the tank 46 with the tank 54. A pipe 71 leads from the tank 54 to a pipe 72 which is connected to a pump 73. The pump 73 is operated by a motor M'. There is also a pipe 74 connected to a header 75 in the tank 1 which maintains the water in the tank at a desired fixed level, which level, of course, is sufficient to maintain the flow of water into the collecting tanks. A pump discharges this water into the pipe 76 which is connected to the pipe 67 and this completes the circuit for the water.

It is thought that the operation of the apparatus will be clear from the description which has been given in describing the apparatus. The mushrooms are conveyed into the apparatus, and through the apparatus and into the collecting tanks entirely by the flowing stream of water. There are no mechanical devices for engaging the mushrooms for moving the same. They are carried by their buoyancy through the grading screen and maintained by their buoyancy in the flowing current of water. This accomplishes the grading of the mushrooms without, in any way, injuring or marring the same.

While the invention has been described as directed to the grading of mushrooms, it will be understood that it may be used in connection with the grading of other food products which are light and capable through their buoyancy of being conveyed by a flowing stream.

It is obvious that minor changes in the details of construction and the arrangement of the parts of the apparatus may be made without departing from the spirit of the invention as set forth in the appended claims.

Having thus described the invention, what I claim as new and desire to secure by Letters-Patent, is—

1. An apparatus for grading mushrooms comprising a tank, a grading cylinder mounted therein for rotation and having openings therethrough, said cylinder having an unobstructed opening from end to end thereof, transverse partitions therein in said tank intermediate the ends of said cylinder separating said tank into compartments, said openings in the cylinder in the region of successive compartments being of gradually increasing size toward the delivery end of the cylinder, means for conveying water and mushrooms to be graded into said cylinder, means leading from each compartment at a point above the grading cylinder for causing the water to flow from the cylinder through the openings into the compartments and from the compartments with the floating mushrooms therein into a collecting tank.

2. An apparatus for grading mushrooms comprising a tank, a grading cylinder mounted therein for rotation and having openings therethrough, said cylinder having an unobstructed opening from end to end thereof, transverse partitions in said tank intermediate the ends of said cylinder separating the same into compartments, said openings in successive compartments being of gradually increasing size toward the delivery end thereof, a chute leading into the receiving end of the grading cylinder for conveying water and mushrooms to be graded into said cylinder, and means leading from each compartment at a point above the grading cylinder for causing the water to flow from the cylinder through the openings into the compartments and from the compartment with the floating mushrooms therein into a collecting tank, said cylinder being inclined upwardly from the receiving end thereof to the delivery end thereof so as to aid in the conveying of the buoyant mushrooms along the upper wall of the cylinder.

3. An apparatus for grading mushrooms comprising a tank, a grading cylinder mounted therein and inclined upwardly from its receiving end to the delivery end thereof and having openings therethrough, transverse partitions in said tank outside of and extending above the cylinder for separating the tank into compartments, said openings in successive compartments being of gradually increasing size toward the delivery end of the cylinder, and means leading into the receiving end of the cylinder for conveying water and mushrooms to be graded into said cylinder.

4. An apparatus for grading mushrooms comprising a tank, a grading cylinder mounted therein and inclined upwardly from its receiving end to the delivery end thereof and having openings therethrough, transverse partitions in said tank outside of and extending above said cylinder for separating the tank into compartments, said openings in successive compartments being of gradually increasing size toward the delivery end of the cylinder, means leading into the receiving end of the cylinder for conveying water and mushrooms to be graded into said cylinder, and means leading from each compartment at the point above the grading cylinder for flowing water from the compartment with the floating mushrooms therein into the collecting tank.

WILLIAM E. CHAMBERS.